(12) United States Patent
Jiang et al.

(10) Patent No.: US 10,447,736 B1
(45) Date of Patent: Oct. 15, 2019

(54) SYSTEMS AND METHODS FOR PROVIDING SECURITY IN SMART BUILDINGS

(71) Applicant: Symantec Corporation, Mountain View, CA (US)

(72) Inventors: Kevin Jiang, San Mateo, CA (US); Ilya Sokolov, Boston, MA (US); Lei Gu, Bedford, MA (US); Michael Shavell, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 208 days.

(21) Appl. No.: 15/177,428

(22) Filed: Jun. 9, 2016

(51) Int. Cl.
*H04L 29/06* (2006.01)

(52) U.S. Cl.
CPC .......... *H04L 63/20* (2013.01); *H04L 63/0861* (2013.01); *H04L 63/102* (2013.01)

(58) Field of Classification Search
CPC ... H04L 63/08; H04L 63/083; H04L 63/0853; H04L 63/0861; H04L 63/0876; H04L 63/10; H04L 63/101; H04L 63/102; H04L 63/105; H04L 63/107; H04L 63/18; H04L 63/20; G06F 21/30; G06F 21/31; G06F 21/316; G06F 21/32; G06F 21/34; G06F 21/35; G06F 21/42; G06F 21/50; G06F 21/55; G06F 21/552; G06F 21/554; G06F 21/57; G06F 21/577; H04W 12/06; H04W 12/08; H04W 12/12
See application file for complete search history.

(56) References Cited

U.S. PATENT DOCUMENTS

| | | |
|---|---|---|
| 6,570,610 B1 | 5/2003 | Kipust |
| 8,281,366 B1 | 10/2012 | McCorkendale et al. |
| 8,881,225 B1 | 11/2014 | Caola et al. |
| 2006/0218575 A1 | 9/2006 | Blair |
| 2007/0083915 A1* | 4/2007 | Janakiraman ......... G06F 21/316 726/4 |
| 2010/0058446 A1 | 3/2010 | Thwaites |
| 2010/0325710 A1* | 12/2010 | Etchegoyen ............ G06F 21/31 726/7 |

(Continued)

OTHER PUBLICATIONS

Aladdin; eToken PRO Anywhere; http://www.alladin.com/etoken/devices/pro-anywhere.aspx, as accessed on Aug. 25, 2009.

(Continued)

*Primary Examiner* — Jung W Kim
*Assistant Examiner* — Adrian Stoica
(74) *Attorney, Agent, or Firm* — FisherBroyles, LLP (57) ABSTRACT

A computer-implemented method for providing security in smart buildings may include (1) detecting the presence of a user in a smart building, (2) determining that the user is unauthorized to access at least one resource in a smart building network within the smart building, (3) in response to determining that the user is unauthorized to access the resource in the smart building network, selecting an authentication policy that provides heightened security within the smart building network, and (4) increasing security within the smart building network to reflect the presence of the user by implementing the authentication policy within the smart building network. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2011/0209200 | A2* | 8/2011 | White | G06F 21/32 |
| | | | | 726/4 |
| 2016/0087957 | A1* | 3/2016 | Shah | H04L 63/205 |
| | | | | 726/1 |
| 2016/0285847 | A1* | 9/2016 | Oberheide | G06F 9/00 |
| 2017/0099311 | A1* | 4/2017 | Kesin | G06N 7/005 |
| 2017/0214679 | A1* | 7/2017 | Lin | H04L 63/083 |

OTHER PUBLICATIONS

Bruce McCorkendale, et al; Systems and Methods for Using Guardian Proximity to Control Computing Activities of Children; U.S. Appl. No. 12/579,093, filed Oct. 14, 2009.

Philips Hue, http://www2.meethue.com/en-us/about-hue/get-started/, as accessed Apr. 22, 2016, Philips Lighting B.V., (Oct. 6, 2015).

Adam Schepis, et al; Systems and Methods for Managing Parental Controls; U.S. Appl. No. 13/364,286, filed Feb. 1, 2012.

\* cited by examiner

SYSTEMS AND METHODS FOR PROVIDING SECURITY IN SMART BUILDINGS

BACKGROUND

Smart building systems often provide security for a building and the devices within and connected to the building. For example, smart home systems may track security for all of the devices connected to a smart home network and ensure the home and the devices are secure. Traditionally, smart building security systems are focused on keeping intruders out. For example, a smart home may automatically lock doors to prevent outsiders from entering the home, or it may alert an owner when a breach has occurred.

However, a building owner may sometimes temporarily allow an outsider into the building without explicitly granting them access to the devices in the building. In the above example, the homeowner may disable alerts when allowing someone into the home (e.g., when hosting a party). In such instances, the smart home security may not provide further security for devices in the home. Furthermore, devices within a smart building network often have simple authentication methods, such as the press of a physical button to use a smart appliance. Additionally, users often assume a home environment is secure and may leave devices unattended or unlocked within the home. Persons allowed inside the home may then be able to access these devices or the smart building network without the consent of the owner. Thus, more stringent security solutions are needed to prevent this type of unauthorized access. Accordingly, the instant disclosure identifies and addresses a need for additional and improved systems and methods for providing security in smart buildings.

SUMMARY

As will be described in greater detail below, the instant disclosure generally relates to systems and methods for providing security in smart buildings by detecting the presence of an unauthorized user and increasing security within a smart building network. For example, the disclosed systems may use biometrics to identify a new user or may sense a new device in the smart building. After identifying the new user, these systems may determine whether the new user is authorized to access devices in the smart building. Furthermore, by managing an authentication policy for the entire smart building network, these systems may improve security standards for access to individual devices within the network.

In one example, a computer-implemented method for providing security in smart buildings may include (1) detecting the presence of a user in a smart building, (2) determining that the user is unauthorized to access at least one resource in a smart building network within the smart building, (3) in response to determining that the user is unauthorized to access the resource in the smart building network, selecting an authentication policy that provides heightened security within the smart building network, and (4) increasing security within the smart building network to reflect the presence of the user by implementing the authentication policy within the smart building network.

In some embodiments, detecting the presence of the user may include detecting biometric information of the user. Additionally or alternatively, in some embodiments, detecting the presence of the user may include detecting a device of the user. In these embodiments, detecting the device of the user may include scanning for devices broadcasting a signal, detecting an attempt to connect to the smart building network, detecting hardware in the smart building, and/or correlating the device to the user. Furthermore, in these embodiments, correlating the device to the user may include detecting an identifier of the device, determining the identifier belongs to the user, and/or determining a physical proximity of the user and the device.

In some examples, determining that the user is unauthorized to access the resource may include determining that the user is not registered with the smart building network and/or determining that the device is not registered with the smart building network. Additionally or alternatively, determining that the user is unauthorized to access the resource may include determining that a permission level of the user does not allow access to the resource.

In one embodiment, the resource may include hardware in the smart building and/or software in the smart building network. Additionally or alternatively, the resource may also include a user account in the smart building network and/or data in the smart building network.

In one example, the authentication policy may include an access protocol, a security policy, and/or a registration policy. In further examples, implementing the authentication policy may include pushing the authentication policy to at least one smart device in the smart building network. In these examples, pushing the authentication policy to the smart device may include distributing the authentication policy from a central policy provider to the smart device via the smart building network.

In some embodiments, the computer-implemented method may further include verifying that the user is a trusted user within the smart building network and reverting to a previous authentication policy with lower security within the smart building network. In these embodiments, verifying that the user is a trusted user may include determining that the user is registered with the smart building network and/or detecting a registration of a new device of the user with the smart building network.

In one example, a system for implementing the above-described method may include (1) a detection module, stored in memory, that detects the presence of a user in a smart building, (2) a determination module, stored in memory, that determines that the user is unauthorized to access at least one resource in a smart building network within the smart building, (3) a selection module, stored in memory, that, in response to determining that the user is unauthorized to access the resource in the smart building network, selects an authentication policy that provides heightened security within the smart building network, and (4) a security module, stored in memory, that increases security within the smart building network to reflect the presence of the user by implementing the authentication policy within the smart building network. In addition, the system may include at least one processor that executes the detection module, the determination module, the selection module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect the presence of a user in a smart building, (2) determine that the user is unauthorized to access at least one resource in a smart building network within the smart building, (3) in response to determining that the user is unauthorized to access the resource in the smart building network, select an authentication policy that provides heightened security within the smart building network, and (4) increase security within the smart building network to reflect the presence of the user by implementing the authentication policy within the smart building network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of representative embodiments and are a part of the specification. Together with the following description, these drawings demonstrate and explain various principles of the instant disclosure.

Throughout the drawings, identical reference characters and descriptions indicate similar, but not necessarily identical, elements. While the representative embodiments described herein are susceptible to various modifications and alternative forms, specific embodiments have been shown by way of example in the drawings and will be described in detail herein. However, the representative embodiments described herein are not intended to be limited to the particular forms disclosed. Rather, the instant disclosure covers all modifications, equivalents, and alternatives falling within the scope of the appended claims.

DETAILED DESCRIPTION OF REPRESENTATIVE EMBODIMENTS

The present disclosure is generally directed to systems and methods for providing security in smart buildings. As will be explained in greater detail below, by detecting new users who are authorized to enter a smart building but have limited authorization to use devices in the smart building network, the systems and methods disclosed herein may identify physical security threats to the smart building. For example, by using facial recognition to identify a new user, the disclosed systems and methods may determine the user is not a registered user with the smart building network. The disclosed systems and methods may then increase security in the smart building by applying a stricter authentication policy to prevent unauthorized access of devices in the network.

Figure 1:
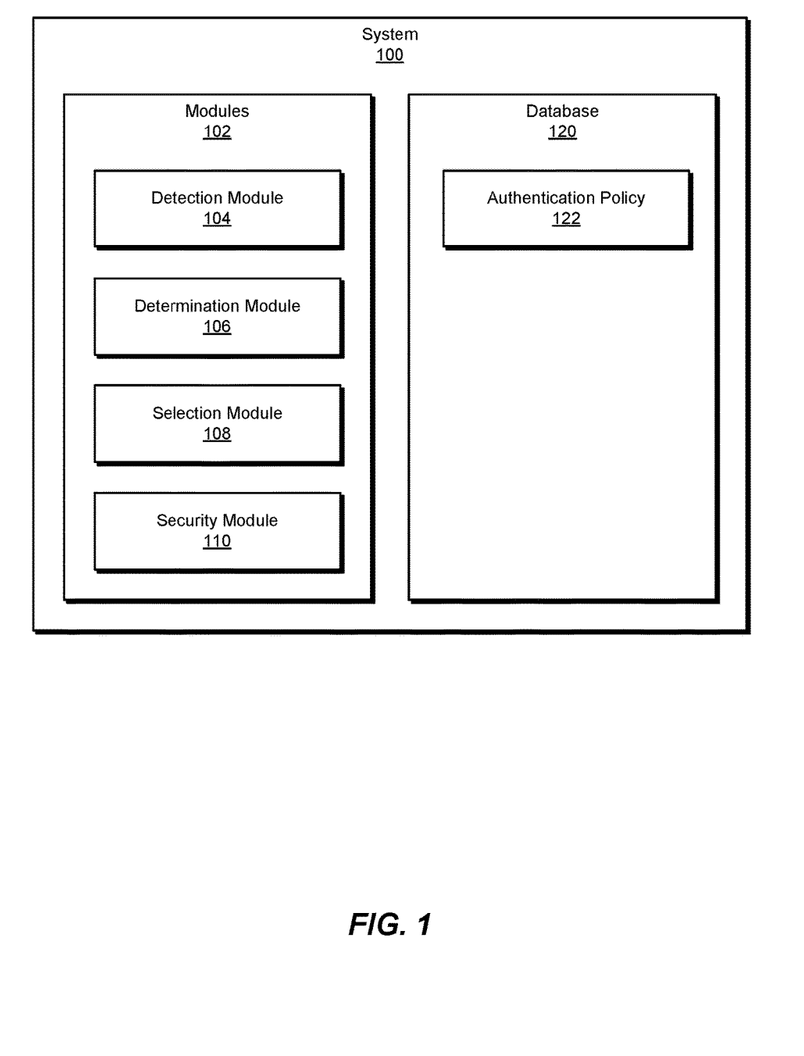
FIG. 1 is a block diagram of a representative system for providing security in smart buildings.
Figure 2:
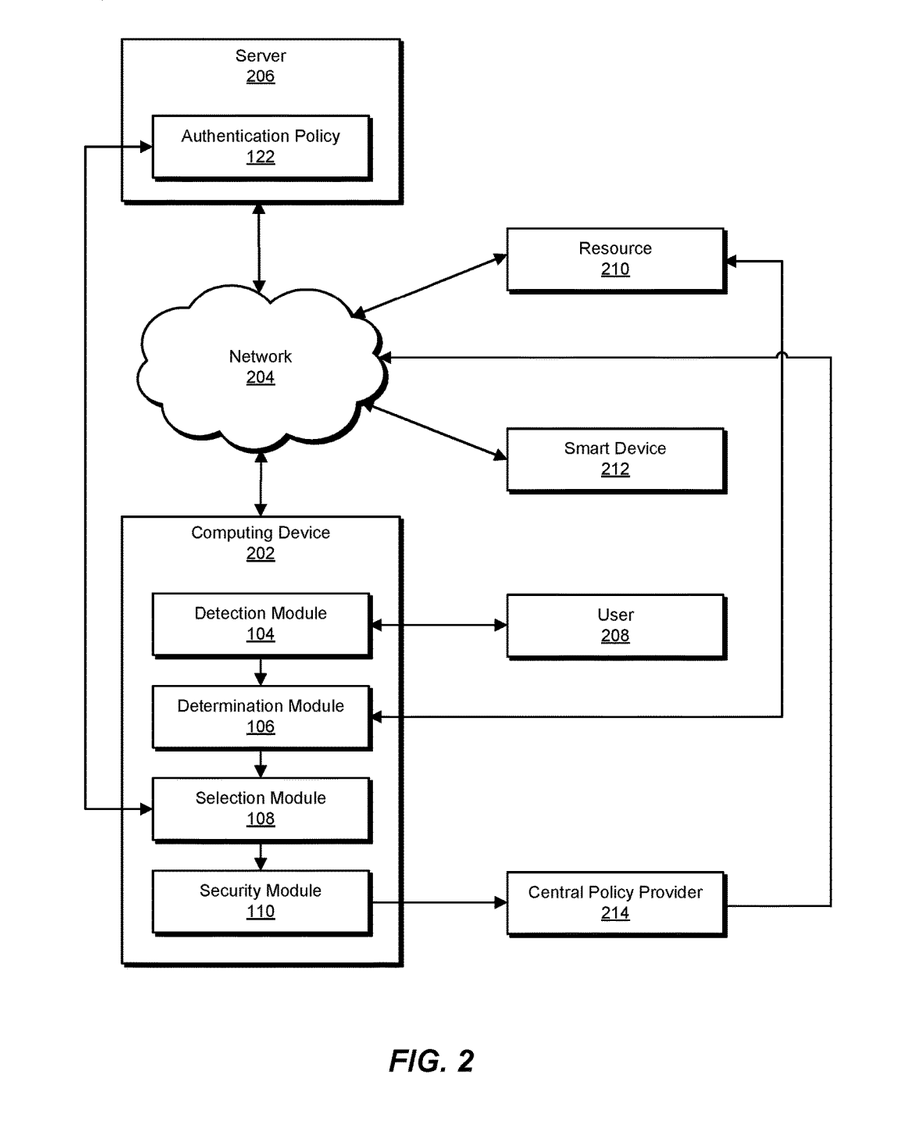
FIG. 2 is a block diagram of an additional representative system for providing security in smart buildings.

The following will provide, with reference to FIGS. 1 and 2, detailed descriptions of representative systems for providing security in smart buildings. Detailed descriptions of corresponding computer-implemented methods will also be provided in connection with FIG. 3. In addition, detailed descriptions of a representative device detection process for user identification within a smart building will be provided in connection with FIG. 4. Furthermore, detailed descriptions of a representative computing system and network architecture capable of implementing one or more of the embodiments described herein will be provided in connection with FIGS. 5 and 6, respectively.

FIG. 1 is a block diagram of representative system 100 for providing security in smart buildings. As illustrated in this figure, representative system 100 may include one or more modules 102 for performing one or more tasks. For example, and as will be explained in greater detail below, representative system 100 may also include a detection module 104 that may detect the presence of a user in a smart building. The term "smart building," as used herein, generally refers to a building containing smart devices that are used to control and automate various activities for the building. Examples of smart buildings may include commercial buildings, industrial buildings, and residences, such as smart homes, installed with smart devices. As used herein, the term "smart device" generally refers to a computing device or sensor capable of autonomous action or performing specific actions with user input and may connect to other smart devices. Examples of smart devices may include, without limitation, smart appliances, smart sensors, smartphones, tablets, wearable smart devices, security systems, lighting systems, HVAC (heating, ventilation, and air conditioning) systems, IOT (Internet of Things) devices, entertainment systems, televisions, or any other device that may be networked.

Representative system 100 of FIG. 1 may additionally include a determination module 106 that may determine that the user may be unauthorized to access at least one resource in a smart building network within the smart building. Representative system 100 may also include a selection module 108 that, in response to determining that the user is unauthorized to access the resource in the smart building network, may select an authentication policy that provides heightened security within the smart building network. The term "authentication policy," as used herein, generally refers to a set of access rules that may apply to a multitude of devices and users.

Representative system 100 may further include a security module 110 that may increase security within the smart building network to reflect the presence of the user by implementing the authentication policy within the smart building network. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of representative network architecture 600 in FIG. 6. One or more of modules 102 in FIG. 1 may also represent all or portions of one or more special-purpose computers configured to perform one or more tasks.

As illustrated in FIG. 1, representative system 100 may also include one or more databases, such as database 120. In one example, database 120 may be configured to store an authentication policy 122, which may include a set of rules for user authentication on devices within the smart building network.

Database 120 may represent portions of a single database or computing device or a plurality of databases or computing devices. For example, database 120 may represent a portion of server 206 in FIG. 2, computing system 510 in FIG. 5, and/or portions of representative network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of representative network architecture 600 in FIG. 6.

Representative system 100 in FIG. 1 may be implemented in a variety of ways. For example, all or a portion of system 100 may represent portions of representative system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to increase smart building security when a physical presence is detected. For example, and as will be described in greater detail below, detection module 104 may detect the presence of a user 208 in a smart building. Determination module 106 may determine that user 208 is unauthorized to access a resource 210 in a smart building network, such as network 204, within the smart building. Selection module 108 may, in response to determining that user 208 is unauthorized to access resource 210, select authentication policy 122 that provides heightened security within network 204. Security module 110 may increase security within network 204 to reflect the presence of user 208 by implementing authentication policy 122 within smart building network 204.

In the example of FIG. 2, and as will be explained in greater detail below, computing device 202 may first detect user 208 upon entry into the smart building. Computing device 202 may then determine that user 208 is unauthorized to access resource 210. Next, computing device 202 may select authentication policy 122 on server 206 via smart building network 204. Finally, computing device 202 may push authentication policy 122 to a central policy provider 214, which may distribute authentication policy 122 to a smart device 212 via network 204. The term "central policy provider," as used herein, generally refers to a software or hardware solution for managing multiple devices. Examples of central policy providers may include, without limitation, security software, mobile device management (MDM), smart home systems, or any other suitable providers that may push information to devices.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, representative computing system 510 in FIG. 5, or any other suitable computing device.

Server 206 generally represents any type or form of computing device that is capable of storing and/or managing information about authentication policies. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), representative network architecture 600 in FIG. 6, or the like. Network 204 may facilitate communication or data transfer using wireless or wired connections. In one embodiment, network 204 may facilitate communication between computing device 202 and server 206. Additionally, network 204 may represent a smart building network for a single building or a collection of buildings. The smart building network may be combined with or separate from network 204. For example, the smart building network may be a local network that may be accessed through network 204.

Figure 3:
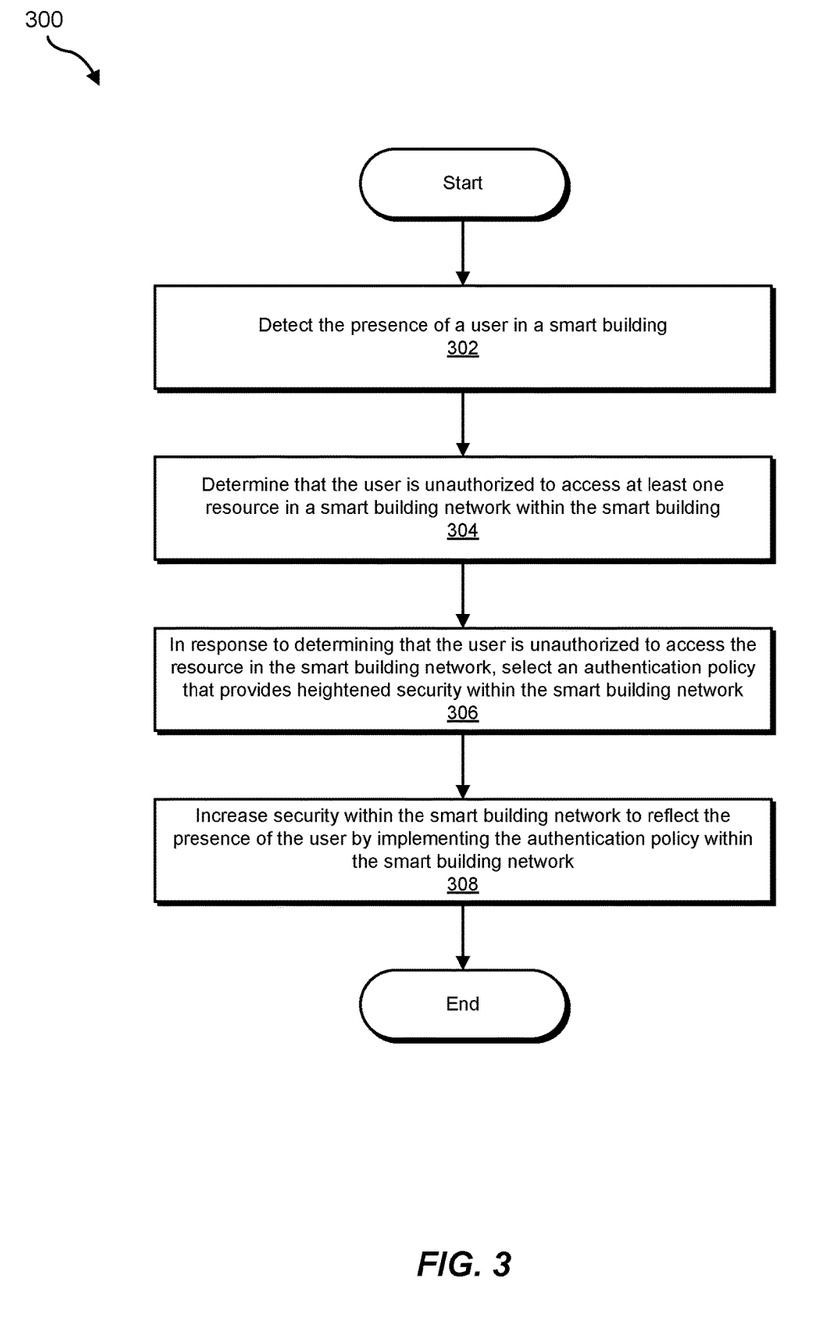
FIG. 3 is a flow diagram of a representative method for providing security in smart buildings.

FIG. 3 is a flow diagram of a representative computer-implemented method 300 for providing security in smart buildings. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of representative network architecture 600 in FIG. 6.

As illustrated in FIG. 3, at step 302, one or more of the systems described herein may detect the presence of a user in a smart building. For example, detection module 104 may, as part of computing device 202 in FIG. 2, detect the presence of user 208 in a smart building.

Detection module 104 may detect user 208 in a variety of ways. In some embodiments, detection module 104 may detect the presence of user 208 by detecting biometric information of user 208. For example, detection module 104 may use sensors for facial recognition to identify user 208. Detection module 104 may also collect biometric information, such as fingerprints or retina scans, when user 208 enters the smart building.

In other embodiments, detection module 104 may detect user 208 by detecting a device of user 208. In these embodiments, detection module 104 may detect the device of user 208 by scanning for devices broadcasting a signal, detecting an attempt to connect to the smart building network, such as network 204, and/or detecting hardware in the smart building. For example, detection module 104 may periodically check for devices attempting to connect to the network, or it may perform a check when triggered by an event, such as an open door. Detection module 104 may also scan for devices broadcasting a wireless signal, such as on a BLUETOOTH signal. Furthermore, detection module 104 may then correlate the device to user 208.

In some examples, detection module 104 may correlate the device to user 208 by detecting an identifier of the device and determining the identifier belongs to user 208. The term "identifier," as used herein, generally refers to a unique label that may distinguish one device from another. The identifier may include user identification information for user 208. Detection module 104 may also retrieve identifier information from a database, such as database 120, or from another source in order to determine the device belongs to user 208. Additionally or alternatively, in some examples, detection module 104 may correlate the device to user 208 by determining a physical proximity of user 208 and the device. In these examples, detection module 104 may use sensors in the smart building to detect the location of user 208 and the location of the device to determine the device belongs to user 208. Detection module 104 may also use a combination of identifier and proximity, such as a close physical proximity and a general identifier or a specific identifier and a general proximity.

Figure 4:
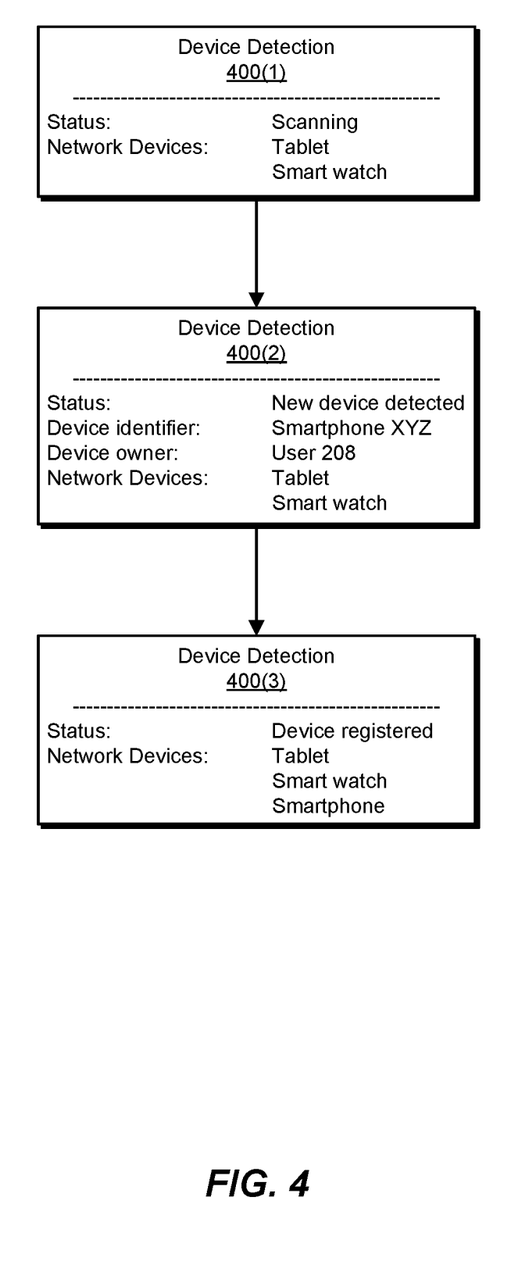
FIG. 4 is a block diagram of a representative device detection process for user identification within a smart building.

For example, as shown in FIG. 4, detection module 104 of FIG. 2 may scan for devices during a device detection process, such as device detection 400(1) (e.g., "Scanning"). Detection module 104 may then determine in device detection 400(2) that a device not in a current device list exists in the smart building (e.g., "New device detected"). Detection module 104 may also determine that the new device belongs to user 208 based on the device identifier (e.g., "Smartphone XYZ").

Returning to FIG. 3, at step 304, one or more of the systems described herein may determine that the user is unauthorized to access at least one resource in a smart building network within the smart building. For example, determination module 106 may, as part of computing device 202 in FIG. 2, determine that user 208 is unauthorized to access resource 210 in smart building network 204 within the smart building.

Determination module 106 may determine that user 208 is unauthorized to access resource 210 in a variety of ways. In some examples, determination module 106 may determine that user 208 is unauthorized to access resource 210 by determining that user 208 is not registered with network 204 and/or determining that the detected device of user 208 is not registered with network 204. In the example of FIG. 4, device detection 400(2) determines the device is not registered in the set of network devices. Additionally or alternatively, in some examples, determination module 106 may determine that a permission level of user 208 does not allow access to resource 210. For example, user 208 may have a low permission level that prohibits user 208 from accessing administrative devices in the smart building. Thus, user 208 may need additional authentication to access resource 210.

In one embodiment, resource 210 may include hardware in the smart building, software in the smart building network, a user account in the smart building network, and/or data accessible via the smart building network. For example, resource 210 may be a browser history on a computing device within network 204. In this example, user 208 may be generally permitted to access the device but not permitted to access the browser history. Resource 210 may also be smart device 212 or any other device or sensor in the smart building network.

Returning to FIG. 3, at step 306, one or more of the systems described herein may, in response to determining that the user is unauthorized to access the resource in the smart building network, select an authentication policy that provides heightened security within the smart building network. For example, selection module 108 may, as part of computing device 202 in FIG. 2, select authentication policy 122 that provides heightened security within smart building network 204.

Selection module 108 may select authentication policy 122 in a variety of ways. In some embodiments, authentication policy 122 may include an access protocol, a security policy, and/or a registration policy. Authentication policy 122 may also include a two-factor authentication or other multi-factor authentication rather than a single authentication method. For example, a smart device that normally only requires the push of a physical button may additionally require a voice command, when authentication policy 122 is selected, to ensure an authorized user is operating the smart device. In additional embodiments, authentication policy 122 may provide heightened security by requiring a different, more secure authentication method to access a device. For example, selection module 108 may select authentication policy 122 that requires a local biometric authentication for a specific device, such as a fingerprint scan for a smartphone, instead of a simple password.

Furthermore, authentication 122 may be selected in various ways. For example, authentication policy 122 may be a default policy that is automatically selected when higher security is needed. Alternatively, in another example, authentication policy 122 may be a customized policy designed for a specific network of smart devices to increase authentication requirements for the smart devices under a specific circumstance, such as detection of an unauthorized user. Individual devices may also implement specific policies based on the overall authentication policy for smart building network 204. For example, a computing device may protect sensitive data with additional authentication requirements while a smart appliance may simply send an alert to an administrator of smart building network 204.

Returning to FIG. 3, at step 308, one or more of the systems described herein may increase security within the smart building network to reflect the presence of the user by implementing the authentication policy within the smart building network. For example, security module 110 may, as part of computing device 202 in FIG. 2, increase security within smart building network 204 to reflect the presence of user 208 by implementing authentication policy 122 within network 204.

Security module 110 may increase security within network 204 in a variety of ways. In some examples, security module 110 may implement authentication policy 122 by pushing authentication policy 122 to smart device 212 in network 204. Security module 110 may directly send authentication policy 122 to smart device 212 or send authentication policy 122 via network 204. Security module 110 may also push authentication policy 122 to multiple devices on network 204, such as smart device 212 and resource 210, rather than only smart device 212. Furthermore, security module 110 may push device-specific authentication policies to each device. For example, authentication policies may include clearing the browser history of a computing device, disabling a Universal Serial Bus (USB) port of a tablet, and requiring additional authentication to access a database.

Additionally, in these examples, pushing authentication policy 122 to smart device 212 may include distributing authentication policy 122 from central policy provider 214 to smart device 212 via smart building network 204. Devices on network 204, such as smart device 212, may then also apply device-specific security based on authentication policy 122.

In addition to implementing an authentication policy with heightened security, the systems described herein may further include verifying that user 208 is a trusted user within smart building network 204 and, subsequently, reverting to a previous authentication policy with lower security. In this embodiment, verifying that user 208 is a trusted user may include determining that user 208 is registered with smart building network 204 and/or detecting a registration of a new device of user 208 with network 204. In the example of FIG. 4, device detection 400(3) may include registering the unknown detected device of user 208 with the list of existing network devices. After registration, the smart building security and/or authentication policy may revert to the security status before the new device and/or user 208 was detected. Registration may include registration of a new user and/or a new device of an existing user. For example, user 208 may bring a new device into the smart building before the smart device is registered. Initially, the smart building may increase security when detecting the unknown new device. After the device is registered, the smart building may lower security again.

Alternatively, in some embodiments, the systems described herein may determine that user 208 is no longer detected within the smart building and/or has left the smart building. In these embodiments, smart building network 204 may also revert to the previous authentication policy with lower security after determining that the potential threat posed by user 208 no longer exists.

As explained above in connection with method 300 in FIG. 3, the disclosed systems and methods may, by detecting the physical presence of a user within a smart building, provide improved security against unauthorized access of devices in the smart building network when the user is allowed inside. For example, a visitor to a business may be allowed in the building but not allowed to access networked computers that may be left unlocked. Specifically, the disclosed systems and methods may first use biometric information to identify the user. For example, the disclosed systems and methods may use facial recognition to identify a user upon entry into the building. Alternatively, the systems and methods described herein may detect a device belonging to the user in order to identify the user through the device. For example, the systems and methods described herein may detect a new device with a wireless network signal and determine the device belongs to an unknown user. The disclosed systems and methods may then determine that the user does not have full access within the smart building.

The disclosed systems and methods may further determine a higher level of security is needed and select a different authentication policy for the smart building network to prevent unauthorized access to devices in the smart building. Additionally, the disclosed systems and methods may then push the authentication policy to devices in the smart building network. Individual devices may then determine the best methods to implement the authentication policy to increase security. Furthermore, if a new user is registered with the smart building, or if a new device belonging to an existing user is added to the smart building network, the disclosed systems and methods may determine the security threat no longer exists and return to a normal authentication policy.

As detailed above, by using physical presence of users to determine threats to a smart building network, the disclosed systems and methods may detect when a threat exists within the smart building. In addition, by pushing a universal authentication policy to devices on the smart building network, the disclosed systems and methods may provide additional protection in security schemes, such as data loss prevention solutions. Thus, the systems and methods described herein may improve smart building security to encompass users within the smart building.

Figure 5:
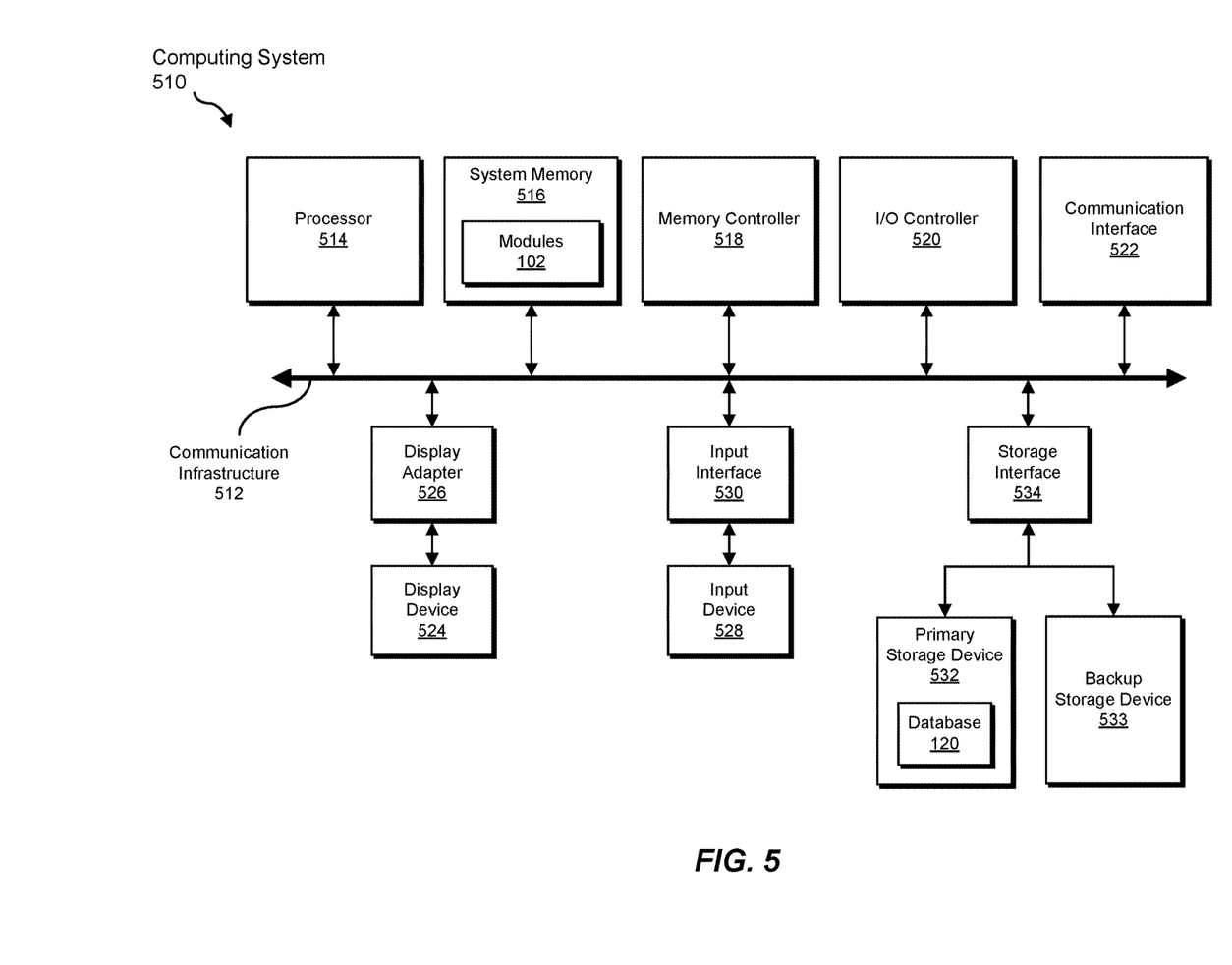
FIG. 5 is a block diagram of a representative computing system capable of implementing one or more of the embodiments described and/or illustrated herein.

FIG. 5 is a block diagram of a representative computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the representative embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, representative computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between representative computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, USB host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, representative computing system 510 may also include at least one input device 528 coupled to communication infrastructure 512 via an input interface 530. Input device 528 generally represents any type or form of input device capable of providing input, either computer or human generated, to representative computing system 510. Examples of input device 528 include, without limitation, a keyboard, a pointing device, a speech recognition device, or any other input device.

As illustrated in FIG. 5, representative computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the representative embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the representative embodiments described and/or illustrated herein. Additionally or alternatively, one or more of the representative embodiments described and/or illustrated herein may be implemented in firmware and/or hardware. For example, computing system 510 may be configured as an Application Specific Integrated Circuit (ASIC) adapted to implement one or more of the representative embodiments disclosed herein.

Figure 6:
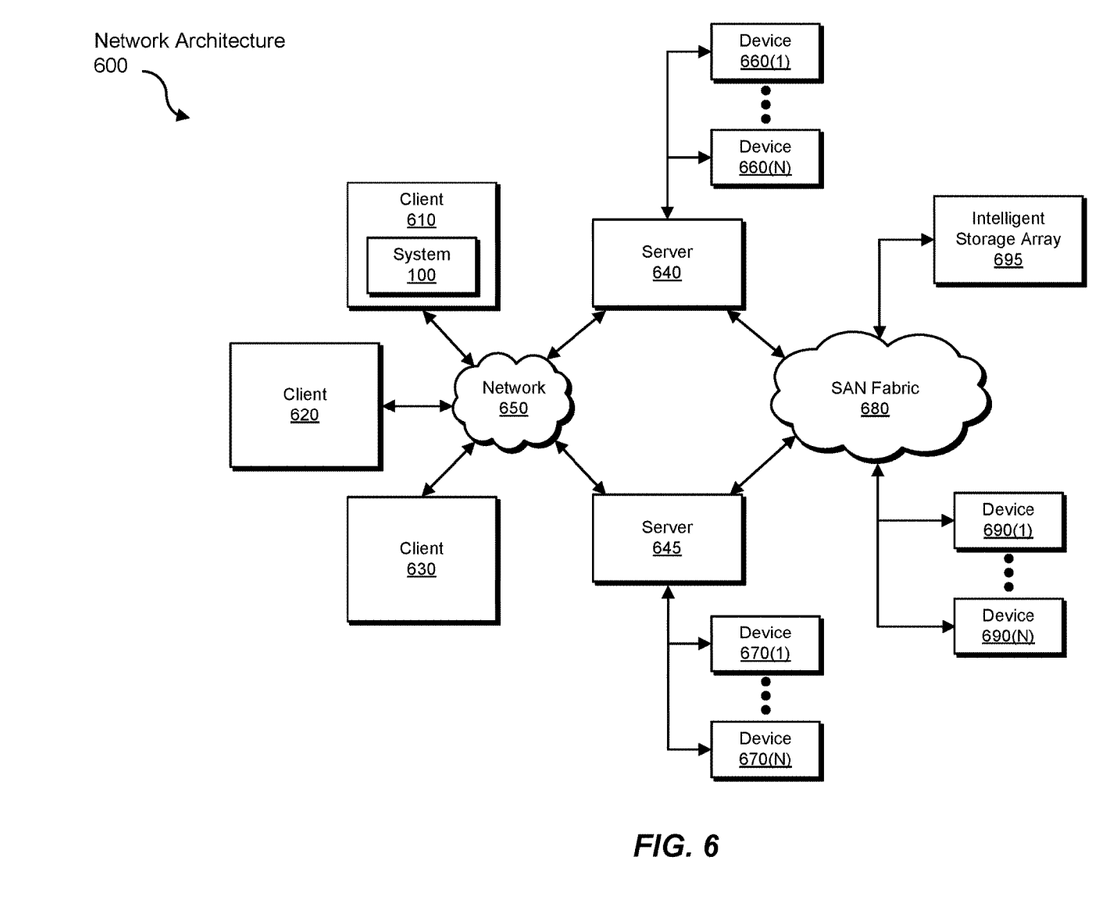
FIG. 6 is a block diagram of a representative computing network capable of implementing one or more of the embodiments described and/or illustrated herein.

FIG. 6 is a block diagram of a representative network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as representative computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to representative computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the representative embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the representative embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of a representative method for providing security in smart buildings.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered representative in nature since many other architectures can be implemented to achieve the same functionality.

In some examples, all or a portion of representative system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of representative system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of representative system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of representative system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of representative system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of representative system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of representative system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various representative methods described and/or illustrated herein may also omit one or more of the steps described or illustrated herein or include additional steps in addition to those disclosed.

While various embodiments have been described and/or illustrated herein in the context of fully functional computing systems, one or more of these representative embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the representative embodiments disclosed herein.

In addition, one or more of the modules described herein may transform data, physical devices, and/or representations of physical devices from one form to another. For example, one or more of the modules recited herein may receive an authentication policy to be transformed, transform the authentication policy, output a result of the transformation to a storage or output device, use the result of the transformation to enforce a security policy for other devices on a network, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the representative embodiments disclosed herein. This representative description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing security in smart buildings, at least a portion of the method being performed by a computing device comprising at least one processor, the method comprising:
    detecting the physical presence of a user in a smart building, wherein the user is authorized to enter the smart building;
    determining that the user is unauthorized to access at least one resource of an Internet of Things device in a smart building network within the smart building;
    in response to determining that the user is unauthorized to access the at least one resource of the Internet of Things device in the smart building network, selecting a stricter authentication policy that provides heightened security within the smart building network compared to a previous authentication policy with lower security; and increasing security within the smart building network to reflect the physical presence of the user by implementing the stricter authentication policy within the smart building network, wherein implementing the stricter authentication policy comprises directly pushing the stricter authentication policy to all Internet of Things devices in the entire smart building network such that each Internet of Things device selects a method to control access to the Internet of Things device based on the stricter authentication policy and a type of the Internet of Things device.

2. The method of claim 1, wherein detecting the physical presence of the user comprises at least one of:
   detecting biometric information of the user; and
   detecting a device of the user.

3. The method of claim 2, wherein detecting the device of the user comprises at least one of:
   scanning for devices broadcasting a signal;
   detecting an attempt to connect to the smart building network;
   detecting hardware in the smart building; and
   correlating the device to the user.

4. The method of claim 3, wherein correlating the device to the user comprises at least one of:
   detecting an identifier of the device;
   determining the identifier belongs to the user; and
   determining a physical proximity of the user and the device.

5. The method of claim 2, wherein determining that the user is unauthorized to access the at least one resource comprises at least one of:
   determining that the user is not registered with the smart building network;
   determining that the device is not registered with the smart building network; and
   determining that a permission level of the user does not allow access to the at least one resource.

6. The method of claim 1, wherein the at least one resource comprises at least one of:
   hardware in the smart building;
   software in the smart building network;
   a user account in the smart building network; and
   data in the smart building network.

7. The method of claim 1, wherein the stricter authentication policy comprises at least one of:
   an access protocol;
   a security policy; and
   a registration policy.

8. The method of claim 1, wherein pushing the stricter authentication policy to the Internet of Things devices in the entire smart building network comprises pushing the stricter authentication policy to a central policy provider.

9. The method of claim 8, wherein pushing the stricter authentication policy to the Internet of Things devices comprises distributing the stricter authentication policy from the central policy provider to the Internet of Things devices via the smart building network.

10. The method of claim 1, further comprising:
    verifying that the user is a trusted user within the smart building network; and
    reverting to the previous authentication policy with lower security within the smart building network.

11. The method of claim 10, wherein verifying that the user is a trusted user comprises at least one of:
    determining that the user is registered with the smart building network; and
    detecting a registration of a new device of the user with the smart building network.

12. A system for providing security in smart buildings, the system comprising:
    a detection module, stored in memory, that detects the physical presence of a user in a smart building, wherein the user is authorized to enter the smart building;
    a determination module, stored in memory, that determines that the user is unauthorized to access at least one resource of an Internet of Things device in a smart building network within the smart building;
    a selection module, stored in memory, that, in response to determining that the user is unauthorized to access the at least one resource of the Internet of Things device in the smart building network, selects a stricter authentication policy that provides heightened security within the smart building network compared to a previous authentication policy with lower security;
    a security module, stored in memory, that increases security within the smart building network to reflect the physical presence of the user by implementing the stricter authentication policy within the smart building network, wherein implementing the stricter authentication policy comprises directly pushing the stricter authentication policy to all Internet of Things devices in the entire smart building network such that each Internet of Things device selects a method to control access to the Internet of Things device based on the stricter authentication policy and a type of the Internet of Things device; and
    at least one processor that executes the detection module, the determination module, the selection module, and the security module.

13. The system of claim 12, wherein the detection module detects the physical presence of the user by at least one of:
    detecting biometric information of the user; and
    detecting a device of the user.

14. The system of claim 13, wherein detecting the device of the user comprises at least one of:
    scanning for devices broadcasting a signal;
    detecting an attempt to connect to the smart building network;
    detecting hardware in the smart building; and
    correlating the device to the user.

15. The system of claim 14, wherein correlating the device to the user comprises at least one of:
    detecting an identifier of the device;
    determining the identifier belongs to the user; and
    determining a physical proximity of the user and the device.

16. The system of claim 13, wherein the determination module determines that the user is unauthorized to access the at least one resource by at least one of:
    determining that the user is not registered with the smart building network;
    determining that the device is not registered with the smart building network; and
    determining that a permission level of the user does not allow access to the at least one resource.

17. The system of claim 12, wherein the stricter authentication policy comprises at least one of:
    an access protocol;
    a security policy; and
    a registration policy.

18. The system of claim 12, wherein pushing the stricter authentication policy to the Internet of Things devices in the entire smart building network comprises pushing the stricter authentication policy to a central policy provider.

19. The system of claim 18, wherein pushing the stricter authentication policy to the Internet of Things devices comprises distributing the stricter authentication policy from the central policy provider to the Internet of Things devices via the smart building network.

20. A non-transitory computer-readable medium comprising one or more computer-executable instructions that, when executed by at least one processor of a computing device, cause the computing device to:
  detect the physical presence of a user in a smart building, wherein the user is authorized to enter the smart building;
  determine that the user is unauthorized to access at least one resource of an Internet of Things device in a smart building network within the smart building;
  in response to determining that the user is unauthorized to access the at least one resource of the Internet of Things device in the smart building network, select a stricter authentication policy that provides heightened security within the smart building network compared to a previous authentication policy with lower security; and
  increase security within the smart building network to reflect the physical presence of the user by implementing the stricter authentication policy within the smart building network, wherein implementing the stricter authentication policy comprises directly pushing the stricter authentication policy to all Internet of Things devices in the entire smart building network such that each Internet of Things device selects a method to control access to the Internet of Things device based on the stricter authentication policy and a type of the Internet of Things device.

\* \* \* \* \*